3,284,473
1-AMINO-4-HYDROXY-2-PHENOXY-ANTHRAQUINONES

Visvanathan Ramanathan, Basel, Switzerland, assignor to Ciba Limited, Basel, Switzerland, a Swiss company
No Drawing. Filed Apr. 24, 1963, Ser. No. 275,199
Claims priority, application Switzerland, Apr. 28, 1962, 5,084/62
6 Claims. (Cl. 260—376)

The present invention provides 1-amino-2-aryloxy-4-hydroxy-anthraquinones that are free from acidic groups imparting solubility in water, especially sulfonic acid groups, and whose aryl radical contains at least one —COR— group, in which R represents an etherified hydroxyl group, for example, a cyclo-alkoxy group or especially an alkoxy group, advantageously one containing at most 6 carbon atoms, or a hydrocarbon radical, for example, an alkyl group, a cycloalkyl group or a phenyl group.

The dyestuffs advantageously correspond to the formula

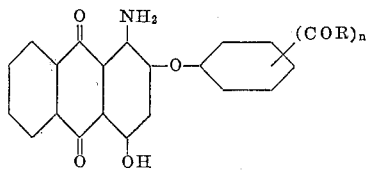

in which R has the meaning given above and $n$ represents an integer of a value from 1 to 3.

Of special importance, however, are above all the dyestuffs of the formula

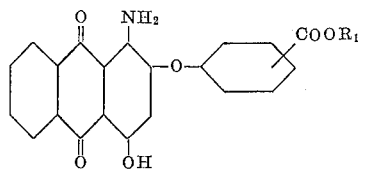

in which $R_1$ represents an alkyl radical, and the carbalkoxy group is in meta-position or para-position to the oxygen bridge.

The new dyestuffs may be obtained by reacting a 1-amino-2-halogen-4-hydroxy-anthraquinone, especially 1-amino-2-bromo-4-hydroxy-anthraquinone, with a hydroxy-aryl compound that contains at least one —COR— group, in which R has the meaning given above. The starting materials used are advantageously hydroxybenzenes, especially those of the formula

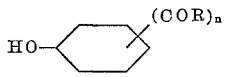

in which R and $n$ have the meanings given above and the —COR— group is advantageously in meta-position or para-position to the hydroxyl group, and the benzene radical can obtain further substituents that do not impart solubility in water, for example, halogen atoms, or alkyl or nitro groups. Hydroxybenzenes of the above formula, in which $n$ represents 1 and R represents a lower alkoxy group, are especially suitable for the reaction of the invention.

As examples there may be mentioned:

para-hydroxybenzoic acid methyl, ethyl, isopropyl, butyl or isobutyl ester,
para-hydroxybenzoic acid cyclohexyl ester,
meta-hydroxybenzoic acid ethyl ester,
4-hydroxy-3-methoxybenzoic acid methyl ester,
4-methoxy-3-hydroxybenzoic acid methyl ester, and
para-hydroxybenzoic acid-β-methoxy ethyl ester.

The reaction is advantageously carried out in the presence of an agent capable of binding acid, for example, an alkali metal hydroxide such, for example, as sodium hydroxide or potassium hydroxide or an alkali metal carbonate, bicarbonate or acetate.

The reaction of the invention can be carried out in an inert solvent, for example, in nitrobenzene, or in an excess of the phenolic reaction component. The reaction is advantageously performed at a raised temperature.

The new dyestuffs so obtained are eminently suitable, especially after conversion into a finely dispersed form, for dyeing and printing synthetic fibrous material, especially fibrous material made from aromatic polyesters, and also for dyeing and printing cellulose ester fibers and polyamide fibers. Red dyeings that are distinguished by a specially good fastness to light and to sublimation are obtained on such fibrous material by the usual dyeing methods, for example, from a dye liquor that contains a dispersion of the dyestuff and advantageously a dispersing agent at a temperature close to 100° C., if necessary, in the presence of a swelling agent, or at a temperature above 100° C. under superatmospheric pressure. The dyestuffs exhibit substantially the same affinity whether applied by one of the above methods or the other.

A further attribute of the dyestuffs of the invention is that they reserve wool well. This makes them specially suitable for dyeing union fabrics made of polyester fibers and wool.

The dyestuffs of the invention are also suitable for application by the so-called Thermosol process, in which process the fabric to be dyed is impregnated at a temperature not exceeding 60° C. with an aqueous dispersion of the dyestuff that advantageously contains 1 to 50% of urea and a thickening agent, especially sodium alginate, and is squeezed in the usual manner. The impregnated fabrics is advantageously squeezed in such a manner that it retains 50 to 100% by weight of dye liquor, calculated on its dry weight. In order to bring about fixation of the dyestuff, the fabric thus impregnated is heated to a temperature above 100° C., for example, to a temperature between 180 and 210° C., advantageously after an intermediate drying operation, for example in a current of hot air.

The above-mentioned Thermosol process is of special interest for the dyeing of union fabrics made of polyester fibers and cellulosic fibers, especially cotton. In this case, the padding liquor contains, in addition to the dyestuff of the invention, dyestuffs suitable for dyeing cotton, for example, vat dyestuffs. When the latter are used, the padded fabric has to be treated with an aqueous alkaline solution of one of the reducing agents normally used in vat dyeing after it has been sujected to the heat treatment.

The following examples illustrate the invention. Unless otherwise stated, the parts and percentages are by weight.

*Example 1*

A mixture of 25 parts of 1-amino-2-bromo-4-hydroxy-anthraquinone, 100 parts of 1:4-hydroxybenzoic acid methyl ester and 6.5 parts of potassium carbonate is heated for about 22 hours at 155° C., while stirring. 100 parts of alcohol are added to the cooled reaction mixture while stirring, and the precipitated dyestuff is filtered off and then washed with hot water. It dyes polyester fibers red tints possessing a good fastness to light and to sublimation.

By using, instead of 1:4-hydroxybenzoic acid methyl ester, the same proportion of 1:3-hydroxybenzoic acid methyl ester and adopting the same procedure, a dyestuff with very similar properties is obtained.

Example 2

12.7 parts of 1-amino-2-bromo-4-hydroxyanthraquinone, 50 parts of para-hydroxy-acetophenone and 3.25 parts of potassium carbonate are heated for about 22 hours at 155° C., while stirring. 100 parts of methanol are added to the cooled reaction mixture while stirring. The precipitated dyestuff is filtered off and washed with hot water. It dyes polyester fibers red tints possessing good properties of fastness.

By using, instead of para-hydroxy-acetophenone, the same proportion of para-hydroxybenzophenone and adopting the same procedure, a dyestuff is obtained which, after recrystallization from chlorobenzene, dyes polyester fibers red tints possessing a very good fastness to light and to sublimation when applied in the form of a fine dispersion.

Example 3

1 part of an aqueous paste of the dyestuff obtained in the manner described in Example 1 and approximately 1 part of dried sulfite cellulose waste liquor are ground to a fine paste in a roller mill, the paste so obtained having a dyestuff content of approximately 10%.

100 parts of a fibrous material made of polyethylene terephthalate are washed for ½ hour in a bath containing 1 to 2 parts of the sodium salt of N-benzyl-µ-heptadecylbenzimidazole disulfonic acid and 1 part of a concentrated aqueous ammonia solution per 1000 parts of water. The material is then treated for 15 minutes at 50° C. in a dyebath containing 9 parts of diammonium phosphate and 1.5 parts of the sodium salt of N-benzyl-µ-heptadecylbenzimidazole disulfonic acid per 3000 parts of water. 9 parts of dissolved sodium-ortho-phenylphenolate are then gradually added, and uptake of the liberated ortho-phenylphenol is effected by agitating the textile material for 15 minutes at 50 to 55° C. 10 parts of the dyestuff paste prepared in the manner described in the first paragraph are then added. The bath is then brought to the boil in the course of ½ to ¾ hour, and dyeing is continued at a temperature as close to the boil as possible for 1 to 1½ hours. When dyeing is completed, the material is well rinsed and, if necessary, washed for ½ hour at 60 to 80° C. with a solution that contains 1 part of the sodium salt of N-benzyl-µ-heptadecylbenzimidazole disulfonic acid per 1000 parts of water. A red dyeing that possesses an excellent fastness to sublimation and to light is obtained.

Example 4

1 part of an aqueous paste of the dyestuff obtained in the manner described in Example 1 and approximately 1 part of dried sulfite cellulose waste liquor are ground to a fine paste in a roller mill, the paste so obtained having a dyestuff content of approximately 10%.

100 parts of a fibrous material made of polyethylene terephthalate are washed for ½ hour in a bath containing 1 to 2 parts of the sodium salt of N-benzyl-µ-heptadecylbenzimidazole disulfonic acid and 1 part of a concentrated aqueous ammonia solution per 1000 parts of water. The material is then entered into a dyebath consisting of 3000 parts of water in which 10 parts of the dyestuff paste prepared in the manner described in the first paragraph has been dispersed in the presence of 54 parts of the sodium salt of N-benzyl-µ-heptadecylbenzimidazole disulfonic acid. The whole is then heated to 120° C. in a pressure vessel and kept at that temperature for about ½ hour. The material is then well rinsed and, if necessary, washed for ½ hour at 60 to 80° C. with a solution containing 1 part of the sodium salt of N-benzyl-µ-heptadecylbenzimidazole disulfonic acid per 1000 parts of water. A red dyeing possessing good properties of fastness is obtained.

What is claimed is:
1. A dyestuff of the formula

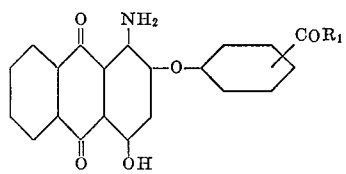

in which $R_1$ represents a member selected from the group consisting of lower alkoxy, methyl and phenyl groups, and the group —$COR_1$— is in meta-position or para-position to the oxygen bridge atom.

2. A dyestuff of the formula

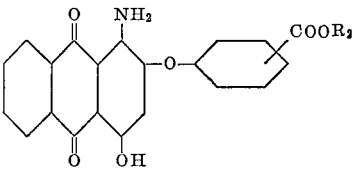

wherein $R_2$ represents lower alkyl and the —$COOR_2$— group is in meta-position or para-position to the oxygen bridge atom.

3. A dyestuff of the formula

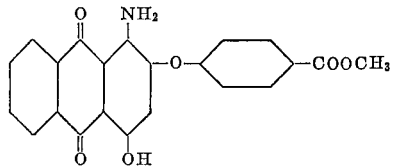

4. A dyestuff of the formula

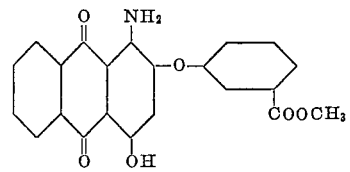

5. A dyestuff of the formula

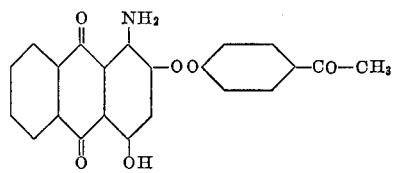

6. A dyestuff of the formula

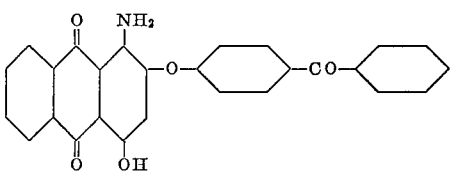

References Cited by the Examiner
UNITED STATES PATENTS 2,773,071   12/1956   Pizzarello et al. _____ 260—380
2,967,752   1/1961    Bucheler _____ 260—376

FOREIGN PATENTS 900,127    7/1962    Great Britain.

LORRAINE A. WEINBERGER, *Primary Examiner.*

LEON ZITVER, *Examiner.*

R. K. JACKSON, H. C. WEGNER, *Assistant Examiners.*